(12) United States Patent
Tsutsui et al.

(10) Patent No.: US 11,009,264 B2
(45) Date of Patent: May 18, 2021

(54) SOLAR HEAT COLLECTOR TUBE

(71) Applicants: KABUSHIKI KAISHA TOYOTA JIDOSHOKKI, Kariya (JP); JAPAN FINE CERAMICS CENTER, Nagoya (JP)

(72) Inventors: Takuhito Tsutsui, Kariya (JP); Toru Sasatani, Kariya (JP); Kazuto Noritake, Kariya (JP); Yoshiki Okuhara, Nagoya (JP); Tomohiro Kuroyama, Nagoya (JP); Daisuke Igimi, Nagoya (JP)

(73) Assignees: KABUSHIKI KAISHA TOYOTA JIDOSHOKKI, Kariya (JP); JAPAN FINE CERAMICS CENTER, Nagoya (JP)

( * ) Notice: Subject to any disclaimer, the term of this patent is extended or adjusted under 35 U.S.C. 154(b) by 190 days.

(21) Appl. No.: 16/073,367

(22) PCT Filed: Nov. 18, 2016

(86) PCT No.: PCT/JP2016/084342
§ 371 (c)(1),
(2) Date: Jul. 27, 2018

(87) PCT Pub. No.: WO2017/130536
PCT Pub. Date: Aug. 3, 2017

(65) Prior Publication Data
US 2019/0041097 A1 Feb. 7, 2019

(30) Foreign Application Priority Data
Jan. 29, 2016 (JP) .............................. JP2016-015505

(51) Int. Cl.
*F24S 70/12* (2018.01)
*F24S 10/70* (2018.01)
(Continued)

(52) U.S. Cl.
CPC ............... *F24S 70/12* (2018.05); *F24S 10/70* (2018.05); *F24S 70/10* (2018.05); *F24S 70/30* (2018.05); *F24S 70/65* (2018.05); *Y02E 10/44* (2013.01)

(58) Field of Classification Search
USPC ......................................................... 126/677
See application file for complete search history.

(56) References Cited

U.S. PATENT DOCUMENTS 5,523,132 A * 6/1996 Zhang ................... F24S 70/225
428/34.4
7,909,029 B2 3/2011 Kuckelkorn et al.
(Continued)

FOREIGN PATENT DOCUMENTS

CN 102102918 A 6/2011
CN 102538261 A 7/2012
(Continued)

OTHER PUBLICATIONS

H. S. Gurev, et al., "High temperature; stable, spectrally selective solar absorbers for thermochemical hydrogen production", International Journal of Hydrogen Energy, Elsevier Science Publishers B.V., Barking, GB, vol. 2, No. 3, Jan. 1, 1977, pp. 259-267 (9 pages total).
(Continued)

*Primary Examiner* — Kenneth J Hansen
*Assistant Examiner* — John E Bargero
(74) *Attorney, Agent, or Firm* — Sughrue Mion, PLLC

(57) ABSTRACT

A solar heat collector tube in which at least an infrared reflective layer, a sunlight-heat conversion layer and an anti-reflection layer are provided on the outer surface of a tube, through the interior of which a heat medium can flow, wherein the infrared reflective layer in the solar heat collector tube has a multilayer structure in which an Ag layer, (Continued)

having dispersed therein at least one metal selected from the group consisting of Mo, W, Ta, Nb and Al, is sandwiched between two metal protective layers.

5 Claims, 7 Drawing Sheets

(51) Int. Cl.
*F24S 70/10* (2018.01)
*F24S 70/65* (2018.01)
*F24S 70/30* (2018.01)

(56) References Cited

U.S. PATENT DOCUMENTS

| | | | |
|---|---|---|---|
| 2003/0137739 A1* | 7/2003 | Yoshida | G02B 5/0221 359/599 |
| 2010/0294263 A1 | 11/2010 | Kuckelkorn et al. | |
| 2010/0313875 A1* | 12/2010 | Kennedy | F24S 10/45 126/652 |
| 2011/0249326 A1* | 10/2011 | Villuendas Yuste | C23C 14/35 359/360 |
| 2014/0144426 A1 | 5/2014 | Cespedes Montoya et al. | |
| 2014/0305123 A1 | 10/2014 | Sato et al. | |
| 2016/0003498 A1 | 1/2016 | Kusiaku et al. | |
| 2018/0246261 A1* | 8/2018 | Templin | C23C 16/06 |

FOREIGN PATENT DOCUMENTS

| | | |
|---|---|---|
| CN | 103443559 A | 12/2013 |
| CN | 104005003 A | 8/2014 |
| DE | 10 2013 112 532 A1 | 5/2015 |
| EP | 2 341 038 A1 | 7/2011 |
| JP | 7315874 A | 12/1995 |
| JP | 2010-271033 A | 12/2010 |
| JP | 2012-506021 A | 3/2012 |
| WO | 2013/141180 A1 | 9/2013 |
| WO | 2014/007218 A1 | 1/2014 |

OTHER PUBLICATIONS

F. W. Wood, et al., "Stabilization of absorber stacks containing Zr or Ti compounds on Ag", Thin Solid Films, Elsevier Sequoia S.A., Lausanne, Amsterdam, NL, vol. 39, Dec. 1, 1976, pp. 133-142 (10 pages total).
B. O. Seraphin, "Chemical vapor deposition of thin semiconductor films for solar energy conversion", Thin Solid Films, Elsevier Sequoia S. A., Lausanne, Amsterdam, NL, vol. 39, Dec. 1, 1976, pp. 87-94 (8 pages total).
H. C. Kim, et al., "Improvement of the thermal stability of silver metallization", Journal of Applied Physics, American Institute of Physics, US, vol. 94, No. 8, Oct. 15, 2003, pp. 5393-5395 (3 pages total).
K. Sugawara, et al., "Comparison of the agglomeration behavior of Ag(Al) films and Ag(Au) films", Microelectronic Engineering, Elsevier Publishers B.V., Amsterdam, NL, vol. 84, No. 11, Sep. 25, 2007, pp. 2476-2480 (5 pages total).
Communication dated Jun. 7, 2019, from the European Patent Office in counterpart European Application No. 16888121.7.
Communication dated Jul. 1, 2019, from the State Intellectual Property Office of the P.R.C. in application No. 201680080206.7.
Communication dated Sep. 16, 2020 from European Patent Office in EP Application No. 16888121.7.

* cited by examiner

[Fig.1]
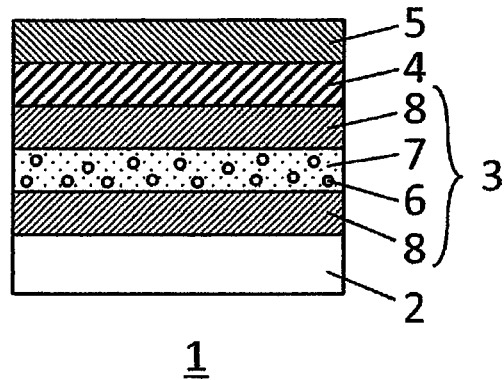
[Fig. 2]
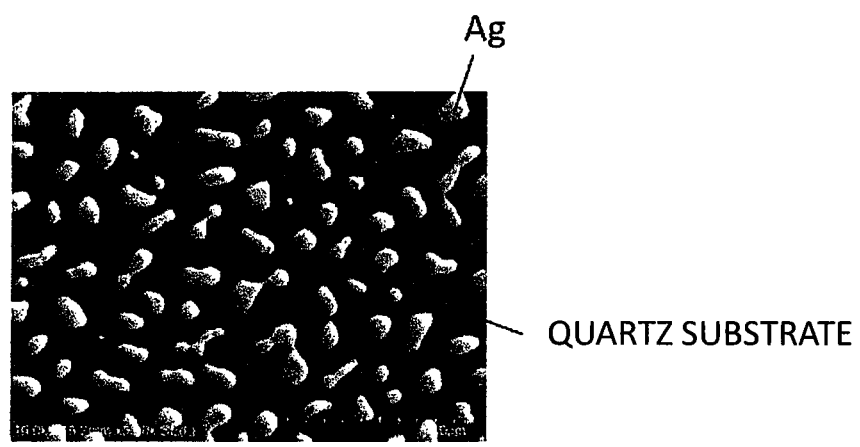
[Fig. 3]
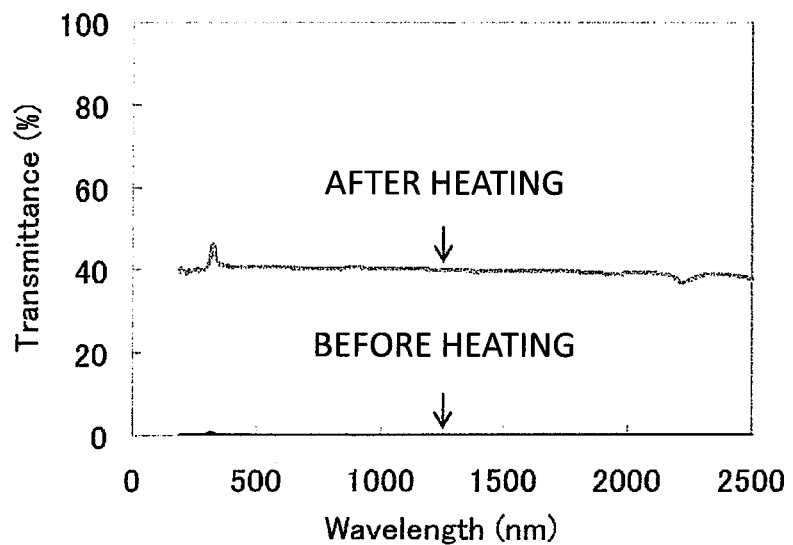

[Fig. 4]
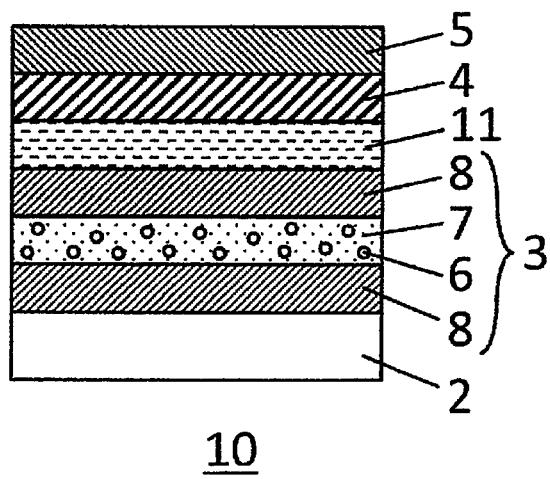
[Fig. 5]
| $Si_3N_4$ LAYER (50 nm) |
|---|
| Ta LAYER (10 nm) |
| Ag LAYER (300 nm, Ta CONTENT 1.2 at%) |
| Ta LAYER (20 nm) |
| QUARTZ SUBSTRATE |

[Fig. 6]
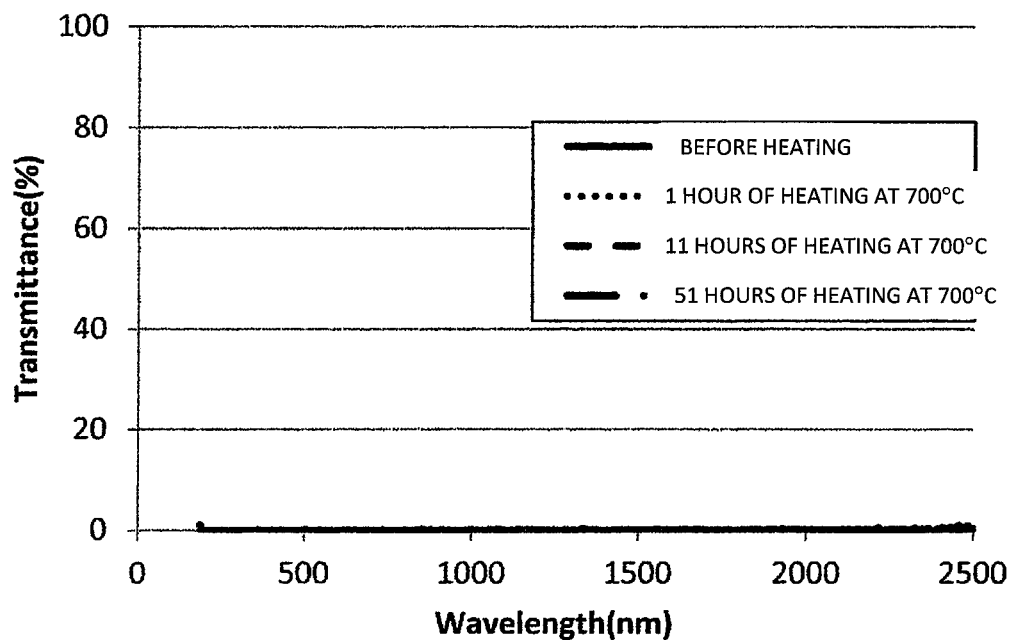
[Fig. 7]
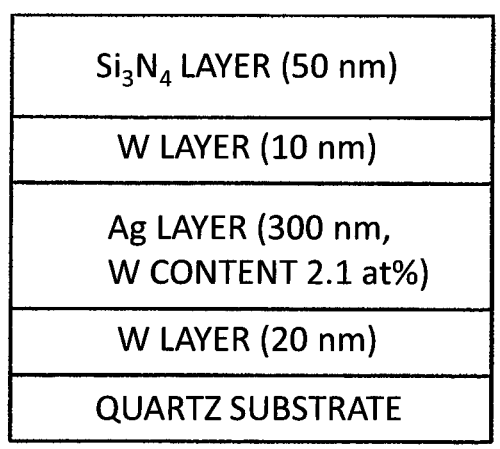

[Fig. 8]
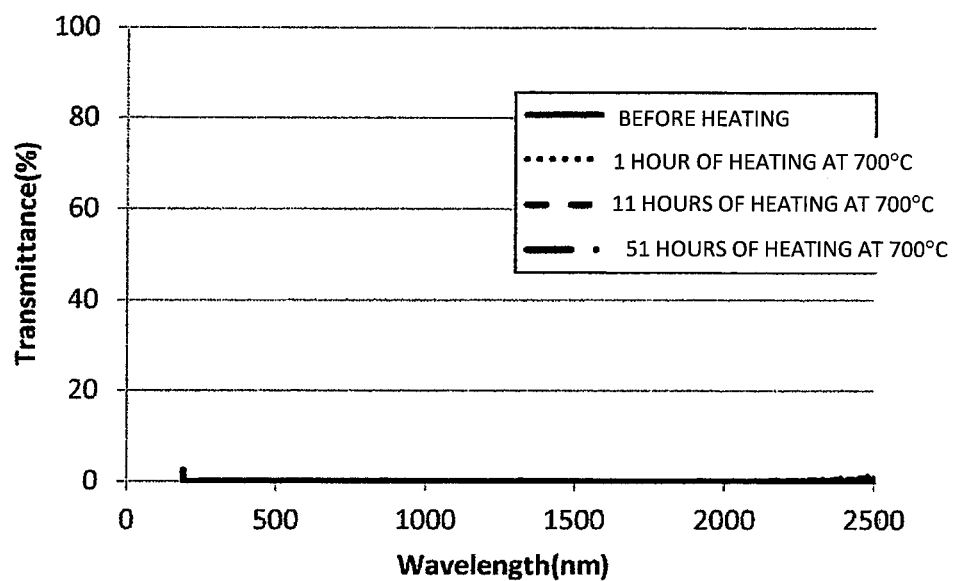
[Fig. 9]
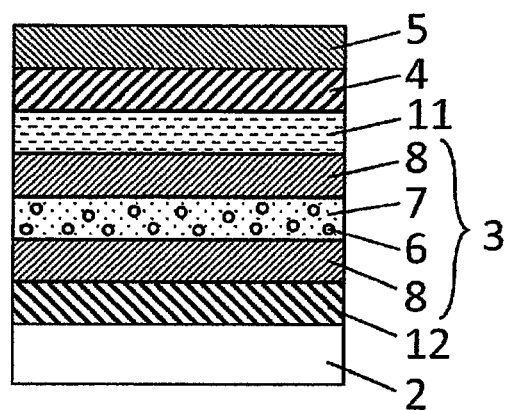

[Fig. 10]
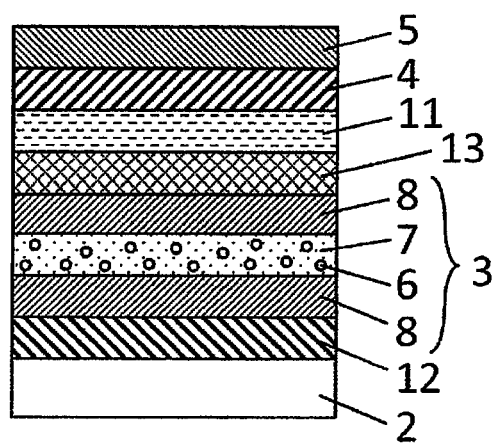
30
[Fig. 11]
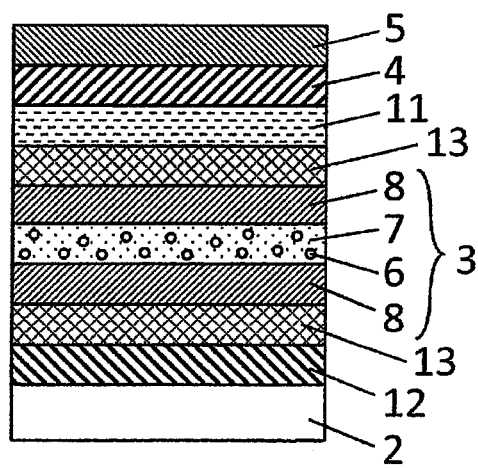
40

[Fig. 12]
| Si$_3$N$_4$ LAYER (50 nm) |
| TaSi$_2$ LAYER (10 nm) |
| Ta LAYER (10 nm) |
| Ag LAYER (300 nm, Ta CONTENT 1.2 at%) |
| Ta LAYER (20 nm) |
| TaSi$_2$ LAYER (20 nm) |
| QUARTZ SUBSTRATE |
[Fig. 13]
OXYGEN BARRIER LAYER

[Fig. 14]
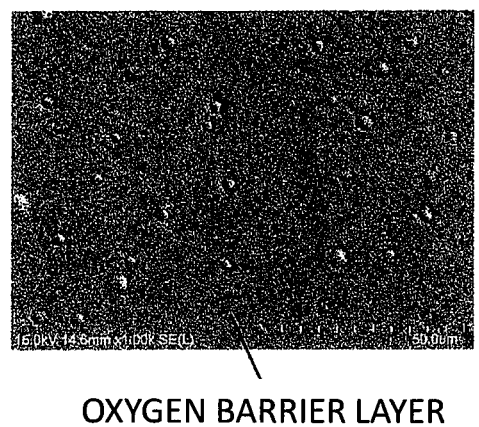
OXYGEN BARRIER LAYER
[Fig. 15]
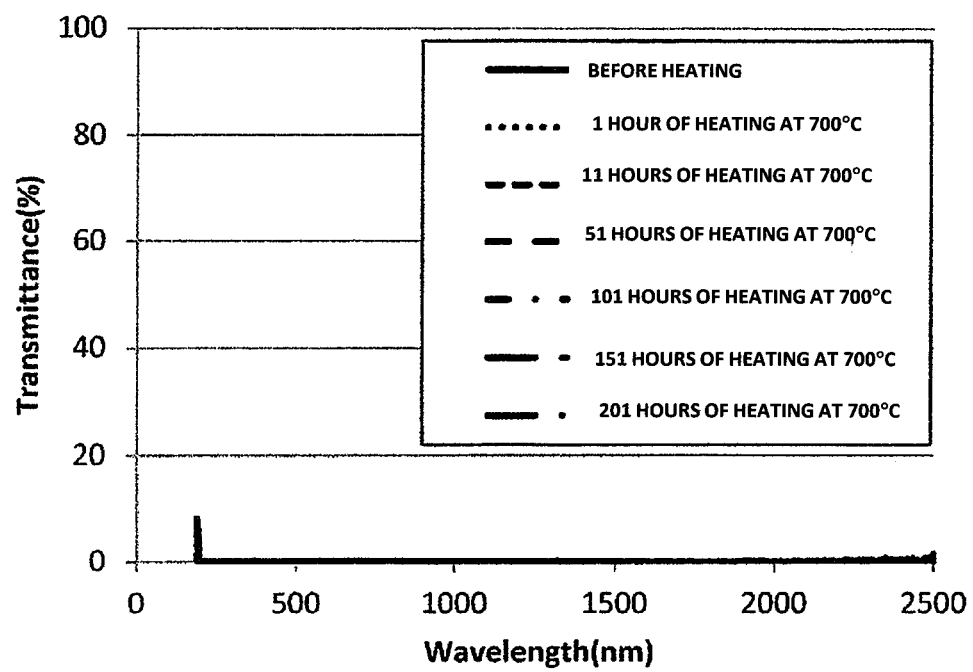

SOLAR HEAT COLLECTOR TUBE

CROSS REFERENCE TO RELATED APPLICATIONS

This Application is a National Stage of International Application No. PCT/JP2016/084342 filed Nov. 18, 2016, claiming priority based on Japanese Patent Application No. 2016-015505 filed Jan. 29, 2016.

TECHNICAL FIELD

The present invention relates to a solar heat collector tube.

BACKGROUND ART

Solar heat power generation apparatuses that convert sunlight to heat and generate power utilizing that heat are known. In these apparatuses, sunlight is condensed by condensing means, a heat medium inside a solar heat collector tube is heated by the condensed sunlight, and thermal energy of the heat medium having been thus heated is utilized to generate power. Such apparatuses utilize therefore a solar heat collector tube in which various layers for efficiently converting sunlight to heat are formed on the outer surface of a tube, through the interior of which the heat medium can flow. On the outer surface of a tube, through the interior of which a heat medium can flow, there are, for instance, formed an infrared reflective layer that reflects thermal radiation from the medium and the tube, a sunlight-heat conversion layer that converts sunlight to heat, and an anti-reflection layer that prevents reflection of sunlight. Among these various layers, using an Ag layer on the infrared reflective layer is well known (see for instance Patent Literature 1).

CITATION LIST

Patent Literature

[Patent Literature 1] Japanese Patent Application Publication No. 2010-271033

SUMMARY OF INVENTION

Technical Problem

When the temperature of the heat medium flowing through the interior of the solar heat collector tube increases, the temperature of the outer surface of the tube having the heat medium flowing therethrough becomes around 650° C. to 700° C., and also the infrared reflective layer formed on the outer surface of the tube becomes exposed to a high temperatures. Herein Ag layers conventionally used as the infrared reflective layer do not have sufficient heat resistance, and as a result Ag suffers aggregation and sublimation, in about 1 hour, when exposed to high temperature, and the effect of reflecting thermal radiation from the heat medium and the tube is weakened. Thus the efficiency of converting sunlight to heat decreases, since the Ag layer in such a state cannot sufficiently function as an infrared reflective layer.

In order to solve the above problem, it is an object of the present invention to provide a solar heat collector tube in which efficiency of conversion of sunlight to heat does not drop readily, through the use, in an infrared reflective layer, of an Ag layer having excellent heat resistance and in which aggregation and sublimation of Ag can be suppressed, even upon exposure to high temperatures.

Solution to Problem

As a result of diligent research aimed at solving the above problem, the inventors found that aggregation and sublimation of Ag can be suppressed by using, in an infrared reflective layer, a multilayer structure in which an Ag layer having dispersed therein at least one metal selected from the group consisting of Mo, W, Ta, Nb and Al is sandwiched between two metal protective layers, and perfected the present invention on the basis of that finding.

Specifically, the present invention is a solar heat collector tube in which at least an infrared reflective layer, a sunlight-heat conversion layer and an anti-reflection layer are provided on the outer surface of a tube, through the interior of which a heat medium can flow, wherein the infrared reflective layer has a multilayer structure in which an Ag layer, having dispersed therein at least one metal selected from the group consisting of Mo, W, Ta, Nb and Al, is sandwiched between two metal protective layers.

Advantageous Effects of Invention

The present invention succeeds in providing a solar heat collector tube in which efficiency of conversion of sunlight to heat does not drop readily, through the use, in an infrared reflective layer, of an Ag layer having excellent heat resistance and in which aggregation and sublimation of Ag can be suppressed, even upon exposure to high temperatures.

BRIEF DESCRIPTION OF DRAWINGS

FIG. 1 is a partial cross-sectional diagram of a solar heat collector tube of Embodiment 1.

FIG. 2 is a scanning electronic microscope (SEM) micrograph of an Ag layer made of Ag alone and formed on a quartz substrate, after having been heated for 1 hour at 700° C.

FIG. 3 illustrates results of light transmittance of an Ag layer made of Ag alone and formed on a quartz substrate, before and after 1 hour of heating at 700° C.

FIG. 4 is a partial cross-sectional diagram of a solar heat collector tube of Embodiment 2.

FIG. 5 is a stack resulting from sequential layering, on a quartz substrate, of a metal protective layer (20 nm Ta layer), an Ag layer (300 nm) having dispersed therein 1.2 at % of Ta, a metal protective layer (10 nm Ta layer) and an oxygen barrier layer (50 nm $Si_3N_4$ layer).

FIG. 6 illustrates results of light transmittance of the stack of FIG. 5 before and after heating of the stack at 700° C. for 1 hour, 11 hours and 51 hours.

FIG. 7 is a stack resulting from sequential layering, on a quartz substrate, of a metal protective layer (20 nm W layer), an Ag layer (300 nm) having dispersed therein 2.1 at % of W, a metal protective layer (10 nm W layer) and an oxygen barrier layer (50 nm $Si_3N_4$ layer).

FIG. 8 illustrates results of light transmittance of the stack of FIG. 7 before and after heating of the stack at 700° C. for 1 hour, 11 hours and 51 hours.

FIG. 9 is a partial cross-sectional diagram of a solar heat collector tube of Embodiment 3.

FIG. 10 is a partial cross-sectional diagram of a solar heat collector tube of Embodiment 4.

FIG. 11 is a partial cross-sectional diagram of a solar heat collector tube of Embodiment 5.

FIG. 12 is a stack resulting from sequential layering, on a quartz substrate, of a reaction preventing layer (20 nm TaSi$_2$ layer), a metal protective layer (20 nm Ta layer), an Ag layer (300 nm) having dispersed therein 1.2 at % of Ta, a metal protective layer (10 nm Ta layer), a reaction preventing layer (10 nm TaSi$_2$ layer) and an oxygen barrier layer (50 nm Si$_3$N$_4$ layer).

FIG. 13 is a scanning electronic microscope (SEM) micrograph of the stack of FIG. 12, after heating at 700° C. for 1 hour.

FIG. 14 is a scanning electronic microscope (SEM) micrograph of the stack of FIG. 12, after heating at 700° C. for 201 hours.

FIG. 15 illustrates results of light transmittance of the stack of FIG. 12 before and after heating of the stack at 700° C. for 1 hour, 11 hours, 51 hours, 101 hours, 151 hours and 201 hours.

DESCRIPTION OF EMBODIMENTS

Preferred embodiments of the solar heat collector tube and production method thereof of the present invention will be explained next with reference to accompanying drawings.

Embodiment 1

FIG. 1 is a partial cross-sectional diagram of a solar heat collector tube of the present embodiment.

In FIG. 1 a solar heat collector tube 1 of the present embodiment has a tube 2, through the interior of which a heat medium can flow, an infrared reflective layer 3 formed on the outer surface of the tube 2, a sunlight-heat conversion layer 4 formed on the infrared reflective layer 3, and an anti-reflection layer 5 formed on the sunlight-heat conversion layer 4.

The tube 2, through the interior of which a heat medium can flow, is not particularly limited, and tubes known in the relevant technical field can be used herein. Ordinarily, a metal having heat resistance, as represented by an iron-based material (for instance, stainless steel, heat-resistant steel, alloy steel or carbon steel) or an aluminum-based material, can be used as the material of the tube 2. Taking the usage environment (for instance, the heating temperature of the tube 2) into account, the tube 2 is preferably made of stainless steel or heat-resistant steel.

The heat medium that flows through the interior of the tube 2 is not particularly limited, and heat media known in the relevant technical field can be used herein. Examples of the heat medium include for instance water, oil, molten salts (for instance molten sodium) and the like.

The infrared reflective layer 3 formed on the outer surface of the tube 2 has the function of reflecting thermal radiation (heat radiation) from the heat medium and the tube 2. The heat medium used in the solar heat collector tube 1 and the materials in the tube 2 and so forth may in some instances become heated to a high temperature of around 650° C. to 700° C., in which case most of the emitted electromagnetic waves are infrared rays. Accordingly, the main function of the infrared reflective layer 3 is to reflect these infrared rays. Specifically, the infrared reflective layer 3 suppresses emission, towards the exterior of the tube 2, of thermal energy given off by the heat medium and the tube 2.

Conventionally an Ag layer 7 has been used as the infrared reflective layer 3. However, an Ag layer 7 made up of only Ag exhibits aggregation or sublimation of Ag, after about 1 hour, when exposed at a high temperature of around 650° C. to 700° C.

FIG. 2 illustrates a scanning electronic microscope (SEM) micrograph of an Ag layer 7 made of Ag alone and formed on a quartz substrate, after having been heated for 1 hour at 700° C. FIG. 3 illustrates results of light transmittance of the Ag layer 7 before and after heating.

As depicted in FIG. 2, Ag in the Ag layer 7 sublimates and aggregates due to heating, and the quartz substrate that is an underlying the layer of Ag layer 7 becomes exposed. As illustrated in FIG. 3, the Ag layer 7 before heating has substantially zero light transmittance at a wavelength region from about 200 nm to 2500 nm (no light is transmitted within this wavelength region), whereas the Ag layer 7 after heating exhibits a light transmittance of about 40% in the wavelength region from about 200 nm to 2500 nm (light is transmitted in this wavelength region). The function as the infrared reflective layer 3 (function of reflecting thermal radiation from the heat medium and the tube) is thus not sufficiently brought out by the Ag layer 7 having suffered aggregation and sublimation of Ag, and accordingly the effect in conversion of sunlight to heat is low.

In the solar heat collector tube 1 of the present embodiment, therefore, a multilayer structure in which an Ag layer 7 having dispersed therein at least one metal 6 selected from the group consisting of Mo, W, Ta, Nb and Al is sandwiched between two metal protective layers 8 is used as the infrared reflective layer 3. Herein the at least one metal 6 selected from the group consisting of Mo, W, Ta, Nb and Al in the infrared reflective layer 3 having such a multilayer structure has the function of suppressing aggregation and sublimation of Ag in the Ag layer 7, as a result of which there is enhanced the heat resistance of the Ag layer 7.

The amount of the at least one metal 6 selected from the group consisting of Mo, W, Ta, Nb and Al dispersed in the Ag layer 7 is not particularly limited, but is preferably lower than 10 at %, and is more preferably 0.1 at % to 7 at %, yet more preferably 0.3 at % to 5 at % and particularly preferably 0.5 at % to 3 at %.

The thickness of the Ag layer 7 having dispersed therein the at least one metal 6 selected from the group consisting of Mo, W, Ta, Nb and Al is not particularly limited, but is preferably 10 nm to 500 nm, more preferably 30 nm to 400 nm, and yet more preferably 50 nm to 300 nm.

The Ag layer 7 having dispersed therein the at least one metal 6 selected from the group consisting of Mo, W, Ta, Nb and Al is formed through sputtering in the presence of an inert gas such as nitrogen gas or argon gas, using a target of Ag and of the at least one metal 6 selected from the group consisting of Mo, W, Ta, Nb and Al. The sputtering conditions are not particularly limited, and may be adjusted as appropriate depending on the apparatus that is utilized. The target may be individual targets of Ag and of the at least one metal 6 selected from the group consisting of Mo, W, Ta, Nb and Al, or one target in the form of a mixture of Ag and of the at least one metal 6 selected from the group consisting of Mo, W, Ta, Nb and Al.

The metal protective layers 8 that make up the infrared reflective layer 3 have the function of preventing diffusion of Ag of the Ag layer 7 into layers adjacent to the infrared reflective layer 3. In particular, the metal protective layer 8 formed on the outer surface of the infrared reflective layer 3 has the function of making Ag in the Ag layer 7 less likely to sublimate. The metal protective layer 8 formed on the inner surface of the infrared reflective layer 3 functions also as an underlying base of the infrared reflective layer 3. Aggregation and sublimation of Ag in the Ag layer 7 can be suppressed by the function of the metal protective layers 8 that sandwich the Ag layer 7, and accordingly impairment of the function of the infrared reflective layer 3 becomes less likely.

The metal protective layers used as the metal protective layers 8 are not particularly limited so long as diffusion of Ag can be prevented, and generally are formed out of a material of higher melting point than that of Ag (melting point 961.8° C.). Examples of materials having a melting point higher than that of Ag include for instance Nb (melting point 2469° C.), Mo (melting point 2623° C.), W (melting point 3422° C.) Cu (melting point 1085° C.), Ni (melting point 1455° C.), Fe (melting point 1538° C.), Cr (melting point 1907° C.), Ta (melting point 3020° C.) and the like.

The metal protective layers 8 may be formed out of a material including the at least one metal 6 selected from the group consisting of Mo, W, Ta, Nb and Al dispersed in the Ag layer 7. As such a material there can be used a compound of silicon or nitrogen and the at least one metal 6 selected from the group consisting of Mo, W, Ta, Nb and Al. Examples of such compounds include for instance $TaSi_2$ (melting point 2200° C.), $MoSi_2$ (melting point 2020° C.), $Mo_5Si_3$ (melting point 2180° C.), $WSi_2$ (melting point 2160° C.), TaN (melting point 3083° C.), $NbSi_2$ (melting point 1930° C.), NbN (melting point 2300° C.) and the like.

Preferably, the material that forms metal protective layers 8 has high reflectance towards light in the infrared region. For instance, Nb has a reflectance of 96.1%, Mo of 97.1%, W of 95.2%, Cu of 97.4%, Ni of 86.4%, Fe of 81.8%, Cr of 81.3%, and Ta of 97.3%, towards infrared light at a wavelength of 2500 nm; preferred herein are thus Ta, Nb, Mo, W and Cu having a reflectance towards light in the infrared region in excess of 90%.

The thickness of the metal protective layer 8 formed on the outer surface of the Ag layer 7 may be set as appropriate for instance depending on the type of material that is used and is not particularly limited, but is preferably smaller than the thickness of the Ag layer 7, from the viewpoint of suppressing thermal radiation.

An appropriate thickness of the metal protective layer 8 formed on the outer surface of the infrared reflective layer 3 may be worked out by calculating emissivity on the basis of the results of a multilayer film approximation using the optical constants of the materials that are utilized in the Ag layer 7 and the metal protective layer 8. In a case for instance where the metal protective layer 8 is formed using Ta on an infrared reflective layer 3 having a thickness of 100 nm and containing 1 at % of Ta, emissivity at 650° C. can be made lower than that of a Cu layer by prescribing the thickness of the metal protective layer 8 (Ta layer) to lie in the range of 0.1 nm to 64 nm. In a case where the metal protective layer 8 is formed using W on an infrared reflective layer 3 having a thickness of 100 nm and containing 1 at % of W, emissivity at 650° C. can be made lower than that of a Cu layer by prescribing the thickness of the metal protective layer 8 (W layer) to lie in the range of 0.1 nm to 12.2 nm.

The thickness of the metal protective layer 8 formed on the inner surface of the Ag layer 7 may be set as appropriate for instance depending on the type of material that is used and is not particularly limited, but is generally 1 nm to 100 nm, preferably 3 nm to 50 nm, and more preferably 5 nm to 30 nm.

The method for forming the metal protective layer 8 is not particularly limited, and a method known in the relevant technical field can be resorted to. For instance, the metal protective layer 8 can be formed by chemical vapor deposition or physical vapor deposition (sputtering, vacuum deposition or ion plating).

The sunlight-heat conversion layer 4 formed on the infrared reflective layer 3 has the function of efficiently absorbing sunlight while suppressing heat dissipation by thermal radiation. The sunlight-heat conversion layer 4 is also referred to as a light-selective absorption layer.

A sunlight-heat conversion layer known in the relevant technical field can be used, without particular limitations, as the sunlight-heat conversion layer 4. Examples of the sunlight-heat conversion layer 4 include, for instance, a black chromium plating layer, a black nickel plating layer, an electroless nickel blackened layer, a triiron tetraoxide (Iron Oxide black) layer, a cermet layer (layer made up of a composite material of a ceramic and a metal), an iron silicide layer, a manganese silicide layer, a chromium silicide layer, or a layer made up of a composite material of manganese silicide or chromium silicide and a transparent dielectric (for instance, $SiO_2$, $Al_2O_3$, AlN or the like). The foregoing layers may be single layers or a plurality of layers of two or more types.

The thickness of the sunlight-heat conversion layer 4 is not particularly limited, but is preferably 1 nm to 10 μm, and more preferably 5 nm to 100 nm.

The method for forming the sunlight-heat conversion layer 4 is not particularly limited, and a method known in the relevant technical field can be resorted to. For instance, the sunlight-heat conversion layer 4 can be formed by chemical vapor deposition, physical vapor deposition (sputtering, vacuum deposition, ion plating or the like), or by plating.

The anti-reflection layer 5 formed on the sunlight-heat conversion layer 4 has the function to inhibit sunlight reflection.

An anti-reflection layer known in the relevant technical field can be used, without particular limitations, as the anti-reflection layer 5. Examples of the anti-reflection layer 5 include, for instance, transparent dielectric layers such as such as $SiO_2$ layers, $Al_2O_3$ layers, AlN layers, $Cr_2O_3$ layers and the like.

The thickness of the anti-reflection layer 5 is not particularly limited, but is preferably 10 nm to 500 nm.

The method for forming the anti-reflection layer 5 is not particularly limited, and a method known in the relevant technical field can be resorted to. For instance, the anti-reflection layer 5 can be formed by chemical vapor deposition or physical vapor deposition (sputtering, vacuum deposition or ion plating).

Through dispersion of the at least one metal 6 selected from the group consisting of Mo, W, Ta, Nb and Al in the Ag layer 7, and sandwiching of the Ag layer 7 between the metal protective layers 8 that prevent diffusion of Ag from the Ag layer 7, the solar heat collector tube 1 of the present embodiment having such features is thereby provided with an infrared reflective layer 3 that suppresses aggregation and sublimation of Ag, and accordingly drops in the efficiency of conversion of sunlight to heat become less likely.

Embodiment 2

FIG. 4 is a partial cross-sectional diagram of a solar heat collector tube of the present embodiment.

In FIG. 4, a solar heat collector tube 10 of the present embodiment differs from the solar heat collector tube 1 of Embodiment 1 in that an oxygen barrier layer 11 is provided between the metal protective layer 8 and the sunlight-heat conversion layer 4. Other features are identical to those of the solar heat collector tube 1 of Embodiment 1, and accordingly will not be explained.

The oxygen barrier layer 11 is provided for the purpose of preventing passage of oxygen, which gives rise to oxidation of the metal protective layer 8. Accordingly, oxidation of the metal protective layer 8 can be prevented through formation of the oxygen barrier layer 11 between the metal protective layer 8 and the sunlight-heat conversion layer 4, and accordingly impairment of the function of the metal protective layer 8 becomes less likely.

The oxygen barrier layer 11 is not particularly limited and any oxygen barrier layer can be employed so long as passage of oxygen thereof is not easy, and for instance a dielectric layer can be used as the oxygen barrier layer 11. Examples of dielectric layers include for instance include for instance $SiO_2$ layers, $Al_2O_3$ layers, AlN layers, $Cr_2O_3$ layers and $Si_3N_4$ layers.

The thickness of the oxygen barrier layer 11 is not particularly limited, so long as passage of oxygen is precluded, but is generally 1 nm to 100 nm, preferably 3 nm to 50 nm, and more preferably 5 nm to 30 nm.

The method for forming the oxygen barrier layer 11 is not particularly limited, and a method known in the relevant technical field can be resorted to. For instance, the oxygen barrier layer 11 can be formed by chemical vapor deposition or physical vapor deposition (sputtering, vacuum deposition or ion plating).

Here, the stack in FIG. 5 is produced through sequential layering, on a quartz substrate, of the metal protective layer 8 (20 nm Ta layer), the Ag layer 7 (300 nm) having 1.2 at % of Ta dispersed therein, the metal protective layer 8 (10 nm Ta layer) and the oxygen barrier layer 11 (50 nm $Si_3N_4$ layer). FIG. 6 illustrates the results of light transmittance of the stack before and after heating of the stack at 700° C. for 1 hour, 11 hours and 51 hours. In this stack the portion at which the Ag layer 7 having 1.2 at % of Ta dispersed therein is sandwiched between the two metal protective layers 8 corresponds to the infrared reflective layer 3. As FIG. 6 reveals, the light transmittance of the stack exhibits virtually no change before or after heating. Therefore, adopting such a multilayer structure allows suppressing aggregation and sublimation of Ag even upon exposure to a high temperature of about 700° C., and accordingly the function as the infrared reflective layer 3 (function of reflecting thermal radiation from the heat medium and the tube) is not impaired, and the efficiency of conversion of sunlight to heat does not drop.

Here, the stack in FIG. 7 is produced through sequential layering, on a quartz substrate, of the metal protective layer 8 (20 nm W layer), the Ag layer 7 (300 nm) having 2.1 at % of W dispersed therein, the metal protective layer 8 (10 nm W layer) and the oxygen barrier layer 11 (50 nm $Si_3N_4$ layer). FIG. 8 illustrates the results of light transmittance of the stack before and after heating of the stack at 700° C. for 1 hour, 11 hours and 51 hours. In this stack the portion at which the Ag layer 7 having dispersed therein 2.1 at % of W is sandwiched between the two metal protective layers 8 corresponds to the infrared reflective layer 3. As FIG. 8 reveals, the light transmittance of the stack exhibits virtually no change before or after heating.

Such an effect can be obtained not only when Ta or W is used as the component that is dispersed in the Ag layer 7, but also when Mo, Nb or Al is used.

In addition to the effect of the solar heat collector tube 1 of Embodiment 1, the solar heat collector tube 10 of the present embodiment having such features allows prevention of impairment in the function of the metal protective layers 8.

Embodiment 3

FIG. 9 is a partial cross-sectional diagram of a solar heat collector tube of the present embodiment.

In FIG. 9 a solar heat collector tube 20 of the present embodiment differs from the solar heat collector tube 10 of Embodiment 2 in that herein a diffusion preventing layer 12 is provided between the tube 2 and the infrared reflective layer 3. Other features are identical to those of the solar heat collector tube 10 of Embodiment 2, and accordingly will not be explained. The features of the present embodiment can also apply to the solar heat collector tube 1 of Embodiment 1.

The diffusion preventing layer 12 is provided for the purpose of preventing components of the tube 2 (for instance Cr) from diffusing into the upper layer (metal protective layer 8 in FIG. 9) overlying the tube 2. Impairment of the function of the upper layer (metal protective layer 8 in FIG. 9) overlying the tube 2 becomes less likely through formation of the diffusion preventing layer 12 on the outer surface of the tube 2.

A diffusion preventing layer known in the relevant technical field can be used, without particular limitations, as the diffusion preventing layer 12. Examples of materials used in the diffusion preventing layer 12 include for instance oxides such as $SiO_2$ and $Al_2O_3$, and nitrides such as $Si_3N_4$ and AlN.

The thickness of the diffusion preventing layer 12 is not particularly limited, so long as components in the tube 2 can be prevented from diffusing into the upper layer, but is generally of 1 nm to 100 nm, preferably 3 nm to 50 nm, and more preferably 5 nm to 30 nm.

The method for forming the diffusion preventing layer 12 is not particularly limited, and a method known in the relevant technical field can be resorted to. For instance, the diffusion preventing layer 12 can be formed by chemical vapor deposition or physical vapor deposition (sputtering, vacuum deposition or ion plating).

In addition to the effect of the solar heat collector tube 1 of Embodiment 1 or the solar heat collector tube 10 of Embodiment 2, the solar heat collector tube 20 of the present embodiment having such features allows prevention of impairment in the function of the upper layer overlying the tube 2.

Embodiment 4

FIG. 10 is a partial cross-sectional diagram of a solar heat collector tube of the present embodiment.

In FIG. 10, a solar heat collector tube 30 of the present embodiment differs from the solar heat collector tube 20 of Embodiment 3 in that a reaction preventing layer 13 is provided between the infrared reflective layer 3 and the oxygen barrier layer 11. Other features are identical to those of the solar heat collector tube 20 of Embodiment 3, and accordingly will not be explained. The features of the present embodiment can also apply to the solar heat collector tube 10 of Embodiment 2.

In a case where the metal protective layers 8 are formed of a metal such as Nb, Mo, W, Cu, Ni, Fe, Cr, Ta or the like, the metal protective layer 8 may react with the oxygen barrier layer 11. The reaction preventing layer 13 is provided in order to prevent such reactions between the metal protective layer 8 in the infrared reflective layer 3 and the oxygen barrier layer 11, Accordingly, impairment of the functions of the infrared reflective layer 3 and the oxygen barrier layer 11 becomes less likely by providing the reaction preventing layer 13 between the infrared reflective layer 3 and the oxygen barrier layer 11.

The reaction preventing layer 13 allows prevention of reactions between the metal protective layer 8 and the sunlight-heat conversion layer 4, even if the oxygen barrier layer 11 is not formed. The reaction preventing layer 13 also has the function of preventing passage of oxygen, and accordingly can substitute for the oxygen barrier layer 11 in this case.

The reaction preventing layer 13 is not particularly limited, so long as reactions between the metal protective layer 8 in the infrared reflective layer 3 and the oxygen barrier layer 11 or the sunlight-heat conversion layer 4 are less likely, and a reaction preventing layer known in the relevant technical field can be used as the reaction preventing layer 13. Examples of materials utilized in the reaction preventing layer 13 include for instance silicides such as niobium silicide ($NbSi_2$) and tantalum silicide ($TaSi_2$). Among the foregoing, the material of the reaction preventing layer 13 is preferably a silicide of a metal that is used in the metal protective layer 8.

The thickness of the reaction preventing layer 13 is not particularly limited so long as reactions between the metal protective layer 8 in the infrared reflective layer 3 and the oxygen barrier layer 11 or the sunlight-heat conversion layer 4 can be prevented, but is generally 1 nm to 200 nm, preferably 3 nm to 100 nm and more preferably 5 nm to 80 nm.

The method for forming the reaction preventing layer 13 is not particularly limited, and a method known in the relevant technical field can be resorted to. For instance, the reaction preventing layer 13 can be formed by chemical vapor deposition or physical vapor deposition (sputtering, vacuum deposition or ion plating).

In addition to the effect of the solar heat collector tube 10 of Embodiment 2 and the solar heat collector tube 20 of Embodiment 3, the solar heat collector tube 30 of the present embodiment having such features allows prevention of impairment of the function of the metal protective layers 8 and the oxygen barrier layer 11 or the sunlight-heat conversion layer 4.

In a case where the metal protective layers 8 are formed of a compound of the at least one metal 6 selected from the group consisting of Mo, W, Ta, Nb and Al dispersed in the Ag layer 7 and silicon or nitrogen (for instance, $TaSi_2$, $MoSi_2$, $Mo_5Si_3$, $WSi_2$, TaN, $NbSi_2$ or NbN), the respective metal protective layer 8 and the oxygen barrier layer 11 do not react readily, and accordingly it is not necessary to provide the reaction preventing layer 13 between the metal protective layer 8 and the oxygen barrier layer 11. Therefore in a case where the metal protective layers 8 are formed from a compound of the at least one metal 6 selected from the group consisting of Mo, W, Ta, Nb and Al dispersed in the Ag layer 7 and silicon or nitrogen, an effect identical to that of the solar heat collector tube 30 of the present embodiment can be achieved, even when the reaction preventing layer 13 is not provided, and also productivity can be increased since it is not necessary to provide the reaction preventing layer 13.

Embodiment 5

FIG. 11 is a partial cross-sectional diagram of a solar heat collector tube of the present embodiment.

In FIG. 11, a solar heat collector tube 40 of the present embodiment differs from the solar heat collector tube 30 of Embodiment 4 in that a reaction preventing layer 13 is provided between the diffusion preventing layer 12 and the infrared reflective layer 3. Other features are identical to those of the solar heat collector tube 30 of Embodiment 4, and accordingly will not be explained. The features of the present embodiment can apply also to the solar heat collector tube 20 of Embodiment 3.

In a case where the metal protective layers 8 in the infrared reflective layer 3 are formed of a metal such as Nb, Mo, W, Cu, Ni, Fe, Cr, Ta or the like, the respective metal protective layer 8 may react with the diffusion preventing layer 12, The reaction preventing layer 13 that is provided between the diffusion preventing layer 12 and the infrared reflective layer 3 is provided in order to prevent reactions between such a diffusion preventing layer 12 and the metal protective layer 8 in the infrared reflective layer 3. Accordingly, impairment of the functions of the diffusion preventing layer 12 and the infrared reflective layer 3 becomes less likely by providing the reaction preventing layer 13 between the diffusion preventing layer 12 and the infrared reflective layer 3.

A reaction preventing layer identical to the reaction preventing layer 13 that is provided between the infrared reflective layer 3 and the oxygen barrier layer 11 can be used as the reaction preventing layer 13 that is provided between the diffusion preventing layer 12 and the infrared reflective layer 3. Among the foregoing, the material of the reaction preventing layers 13 is preferably a silicide of a metal that is used in the metal protective layers 8.

The thickness of the reaction preventing layer 13 provided between the diffusion preventing layer 12 and the infrared reflective layer 3 is not particularly limited, so long as reactions between the diffusion preventing layer 12 and the metal protective layers 8 in the infrared reflective layer 3 can be prevented, but is generally 1 nm to 150 nm, preferably 5 nm to 100 nm and more preferably 10 nm to 80 nm.

Herein there is produced the stack in FIG. 12 through sequential layering, on a quartz substrate, of the reaction preventing layer 13 (20 nm $TaSi_2$ layer), the metal protective layer 8 (20 nm Ta layer), the Ag layer 7 (300 nm) having 1.2 at % of Ta dispersed therein, the metal protective layer 8 (10 nm Ta layer), the reaction preventing layer 13 (10 nm $TaSi_2$ layer) and the oxygen barrier layer 11 (50 nm layer). FIGS. 13 and 14 illustrate electronic microscope (SEM) micrographs of the stack after heating at 700° C. for 1 hour and for 201 hours, respectively. FIG. 15 illustrates the results of light transmittance of the stack before and after heating of the stack at 700° C. for 1 hour, 11 hours, 51 hours, 101 hours, 151 hours and 201 hours. In this stack the portion at which the Ag layer 7 having dispersed therein 1.2 at % of Ta is sandwiched between the two metal protective layers 8 corresponds to the infrared reflective layer 3.

As FIGS. 13 and 14 illustrate, no change in the state of the stack was observed even upon prolonged heating. As FIG. 15 reveals, the light transmittance of the stack exhibits virtually no change before or after heating. In such a stack, therefore, aggregation and sublimation of Ag can be suppressed, without impairment of the functions of the layers, even when the stack is exposed to a high temperature of about 700° C. Accordingly, it becomes possible to preserve the efficiency of conversion of sunlight to heat.

In addition to the effect of the solar heat collector tube 20 of Embodiment 3 and of the solar heat collector tube 30 of Embodiment 4, the solar heat collector tube 40 of the present embodiment having such features allows prevention of impairment of the functions of the metal protective layer 8 and the diffusion preventing layer 12.

In a case where the metal protective layers 8 are formed of a compound of the at least one metal 6 selected from the group consisting of Mo, W, Ta, Nb and Al dispersed in the Ag layer 7 and silicon or nitrogen (for instance, $TaSi_2$, $MoSi_2$, $Mo_5Si_3$, $WSi_2$, TaN, $NbSi_2$ or NbN), the diffusion preventing layer 12 and the metal protective layer 8 do not react readily, and accordingly it is not necessary to provide the reaction preventing layer 13 between the diffusion preventing layer 12 and the metal protective layer 8. Therefore, in a case where the metal protective layers 8 are formed from a compound of the at least one metal 6 selected from the group consisting of Mo, W, Ta, Nb and Al dispersed in the Ag layer 7 and silicon or nitrogen, an effect identical to that of the solar heat collector tube 40 of the present embodiment can be achieved, even when the reaction preventing layer 13 is not provided, and also productivity can be increased since it is not necessary to provide the reaction preventing layer 13.

The present international application claims priority based on Japanese Patent Application No. 2016-015505, filed on Jan. 29, 2016, the entire contents whereof being incorporated herein by reference.

REFERENCE SIGNS LIST

1, 10, 20, 30, 40 Solar heat collector tube
2 Tube
3 Infrared reflective layer
4 Sunlight-heat conversion layer
5 Anti-reflection layer
6 At least one metal selected from the group consisting of Mo, W, Ta, Nb and Al
7 Ag layer
8 Metal protective layer
11 Oxygen barrier layer
12 Diffusion preventing layer
13 Reaction preventing layer

The invention claimed is:

1. A solar heat collector tube in which at least an infrared reflective layer, a sunlight-heat conversion layer and an anti-reflection layer are provided on an outer surface of the solar heat collector tube, through an interior of which a heat medium can flow, wherein the infrared reflective layer has a multilayer structure in which an Ag layer, having dispersed therein at least one metal selected from a group consisting of Mo, W, Ta, Nb and Al, is sandwiched between two metal protective layers, wherein the metal protective layers are formed by at least one metal selected from a group consisting of Mo, W, Ta and Nb, or a compound of the at least one metal and silicon or nitrogen, and wherein an oxygen barrier layer is provided directly between one of the metal protective layers and the sunlight-heat conversion layer.

2. The solar heat collector tube of claim 1, wherein a diffusion preventing layer is provided between the tube and the infrared reflective layer.

3. The solar heat collector tube of claim 1, wherein a reaction preventing layer is provided between the infrared reflective layer and the sunlight-heat conversion layer.

4. The solar heat collector tube of claim 2, wherein a reaction preventing layer is provided between the diffusion preventing layer and the infrared reflective layer.

5. The solar heat collector tube of claim 1, wherein a reaction preventing layer is provided between the infrared reflective layer and the oxygen barrier layer.

\* \* \* \* \*